United States Patent
Kreuzer et al.

(10) Patent No.: US 6,923,715 B2
(45) Date of Patent: Aug. 2, 2005

(54) DEVICE FOR REGULATING THE AIR VOLUME FLOW FOR A VENT IN A LABORATORY

(75) Inventors: Konrad Kreuzer, Lauben (DE); Frank Barth, Leverkusen (DE); Horst Esch, Kerpen (DE)

(73) Assignees: Waldner Laboreinrichtungen GmbH & Co. KG, Wangen im Allgaeu (DE); Bayer AG, Leverkusen (DE)

( * ) Notice: Subject to any disclaimer, the term of this patent is extended or adjusted under 35 U.S.C. 154(b) by 2 days.

(21) Appl. No.: 10/467,077
(22) PCT Filed: Feb. 5, 2001
(86) PCT No.: PCT/EP01/01222
§ 371 (c)(1),
(2), (4) Date: Feb. 25, 2004
(87) PCT Pub. No.: WO02/062496
PCT Pub. Date: Aug. 15, 2002

(65) Prior Publication Data

US 2004/0121716 A1 Jun. 24, 2004

(51) Int. Cl.⁷ .............................................. B08B 15/02
(52) U.S. Cl. .............................. 454/56; 454/49; 454/58; 126/299 F
(58) Field of Search ............................. 454/49, 56, 57, 454/58, 59; 126/299 F, 299 R, 299 D

(56) References Cited

U.S. PATENT DOCUMENTS

| | | | | |
|---|---|---|---|---|
| 3,811,250 A | * | 5/1974 | Fowler, Jr. | 96/422 |
| 4,040,042 A | * | 8/1977 | Mayer | 454/340 |
| 4,098,174 A | * | 7/1978 | Landy | 454/57 |
| 4,166,448 A | * | 9/1979 | Miller et al. | 126/299 D |
| 4,553,475 A | | 11/1985 | Saunders | |
| 4,602,924 A | | 7/1986 | Eschenburg | |
| 5,518,446 A | | 5/1996 | Jacob | |
| 6,079,627 A | * | 6/2000 | Kettler | 236/49.3 |
| 6,302,779 B1 | * | 10/2001 | Ryan et al. | 454/61 |
| 6,350,194 B1 | * | 2/2002 | Haugen et al. | 454/56 |
| 6,623,538 B2 | * | 9/2003 | Thakur et al. | 55/385.2 |

FOREIGN PATENT DOCUMENTS

| | | |
|---|---|---|
| DE | 33 19 085 A1 | 11/1984 |
| DE | 195 28 780 A1 | 2/1997 |
| DE | 195 45 948 A1 | 6/1997 |
| DE | 196 00 291 A1 | 7/1997 |
| DE | 199 40 042 A1 | 3/2001 |
| GB | 2 136 560 A | 9/1984 |

\* cited by examiner

*Primary Examiner*—Derek S. Boles
(74) *Attorney, Agent, or Firm*—Nixon Peabody LLP; David S. Safran

(57) ABSTRACT

A device for regulating the air volume flow for a laboratory exhaust, has a rectangular housing (6) which can be arranged on the laboratory exhaust. The device is equipped with inflow devices that can be connected to the interior of the laboratory exhaust and with outflow devices (8, 12, 13) that can be connected to an exhaust air system. The interior of housing (6) is divided by a partition (17) into two parts, namely a calming part on the exhaust side and a measurement and regulating part on the outflow side, and these two parts are connected by an air deflection area (18). A rectangular measurement orifice (20, 25) has pressure measurement devices (22, 23, 24, 28, 29) and a rectangular regulating flap (21) arranged one after the other at a distance in the direction of flow between a housing wall and the partition (17).

14 Claims, 4 Drawing Sheets

DEVICE FOR REGULATING THE AIR
VOLUME FLOW FOR A VENT IN A
LABORATORY

BACKGROUND OF THE INVENTION

1. Field of the Invention

This invention relates to a device for regulating the air volume flow for a laboratory exhaust.

2. Description of Related Art

Laboratory exhaust systems must comply precisely with the volume flow limits stipulated by legislation. However, because of the space conditions, it is almost impossible to accurately measure and display the air volume flow, because the flow conditions in front of and inside the exhaust are disturbed, and due to the structural situation, there is hardly any space to include, a usable measurement zone after installation of an exhaust. Therefore, when using an exhaust system, measurement and regulation of the air volume flow stipulated by legislation are very problematical.

German Patent Application 19528780 A1 has already described a measurement device for measuring the air volume flow through an exhaust by means of which the amount of air flow rate can be measured with a very high precision. This measurement device includes a housing, which can be placed on the exhaust and is equipped with inflow devices that can be connected to the interior of the exhaust and outflow devices that can be connected to an exhaust air system. The interior of the housing is subdivided by a partition into a part on the exhaust side and a part on the outflow side, the two parts being connected by an air deflection area. A pipeline is provided in the part of the interior of the housing on the outflow side, with a measurement orifice being arranged therein for measuring the air volume flow.

This known device is used exclusively for measuring the air volume flow, but there is no possibility of regulating the air volume flow. The air flow is deflected repeatedly inside the housing, namely from the part on the exhaust side into the part on the outflow side and from there into the pipeline and from the pipeline back into the outflow channel, thus resulting in a very great pressure drop.

German Patent Application 19545948 A1 describes a device for measuring and regulating the air volume flow in an exhaust, but it has the disadvantage that a calming zone is needed upstream from the regulator of this device, and this makes the device bulky.

German Patent 196 00291 A1 describes a device for measuring the pressure difference in a gas flow in which it is possible to switch between two different measurement methods by way of comparative measurements, so that the measurement methods can provide mutual monitoring in this way. However, there is a switch here between measuring a static pressure and measuring an effective pressure, which has the disadvantage that measurement of the static pressure depends on the installation site of the exhaust, the position of the sliding window and similar parameters.

SUMMARY OF THE INVENTION

The primary object of the present invention is to provide a device for regulating the air volume flow for a laboratory exhaust system which is capable of not only measuring and monitoring but also regulating the air volume flow independently of the type of exhaust and the oncoming flow and outgoing flow arrangements involving the exhaust.

Another object of the present invention is to make it possible to measure and regulate the air flow rate through the exhaust over the shortest possible distance.

A further object of the present invention to provide a device for regulating the air volume flow for a laboratory exhaust system that is capable of monitoring the air volume flow independently of the installation site and location of the laboratory exhaust system by introducing another measurement site for the air volume flow.

These objects are achieved by providing a device for regulating the air flow volume flow for a laboratory exhaust system having a rectangular housing which can be placed on the laboratory exhaust. The device is equipped with in flow devices that can be connected to the interior of the laboratory exhaust and with outflow devices that can be connected to an exhaust air system. The interior of the housing is divided by a partition into two parts, namely, a calming part on the exhaust side and a measurement and regulating part on the outflow side, these parts being connected by an air deflection area. Also provided is at least one rectangular measurement orifice having pressure measurement devices and a rectangular flap arranged one after the other in the direction of flow between the a housing wall and the partition in the measurement and regulating part with a distance between them.

In one embodiment, two measurement orifices are provided, these being arranged at the same level in the measurement and regulating part in the direction of flow.

In another embodiment, the pressure measurement devices are designed so that they detect the effective pressure in front of the at least one measurement orifice, downstream from the at least one measurement orifice and downstream from the regulating flap and they form the effective pressure differences across the regulating flap.

In yet an other embodiment, the device includes a sound-absorbent lining in the housing.

In a further embodiment, at least one measurement orifice and a regulating flap are arranged in such a way that calming zones are formed between the deflecting area and the at least one measurement orifice and between the at least one measurement orifice and the regulating flap.

In another embodiment, the device includes a maintenance port designed in the front side of the housing.

In another embodiment, the depth of the housing is greater than its height.

These and further objects, features and advantages of the present invention will become apparent from the following description when taken in connection with the accompanying drawings which, for purposes of illustration only, show a single embodiment in accordance with the present invention.

DETAILED DESCRIPTION OF THE INVENTION

Figure 1:
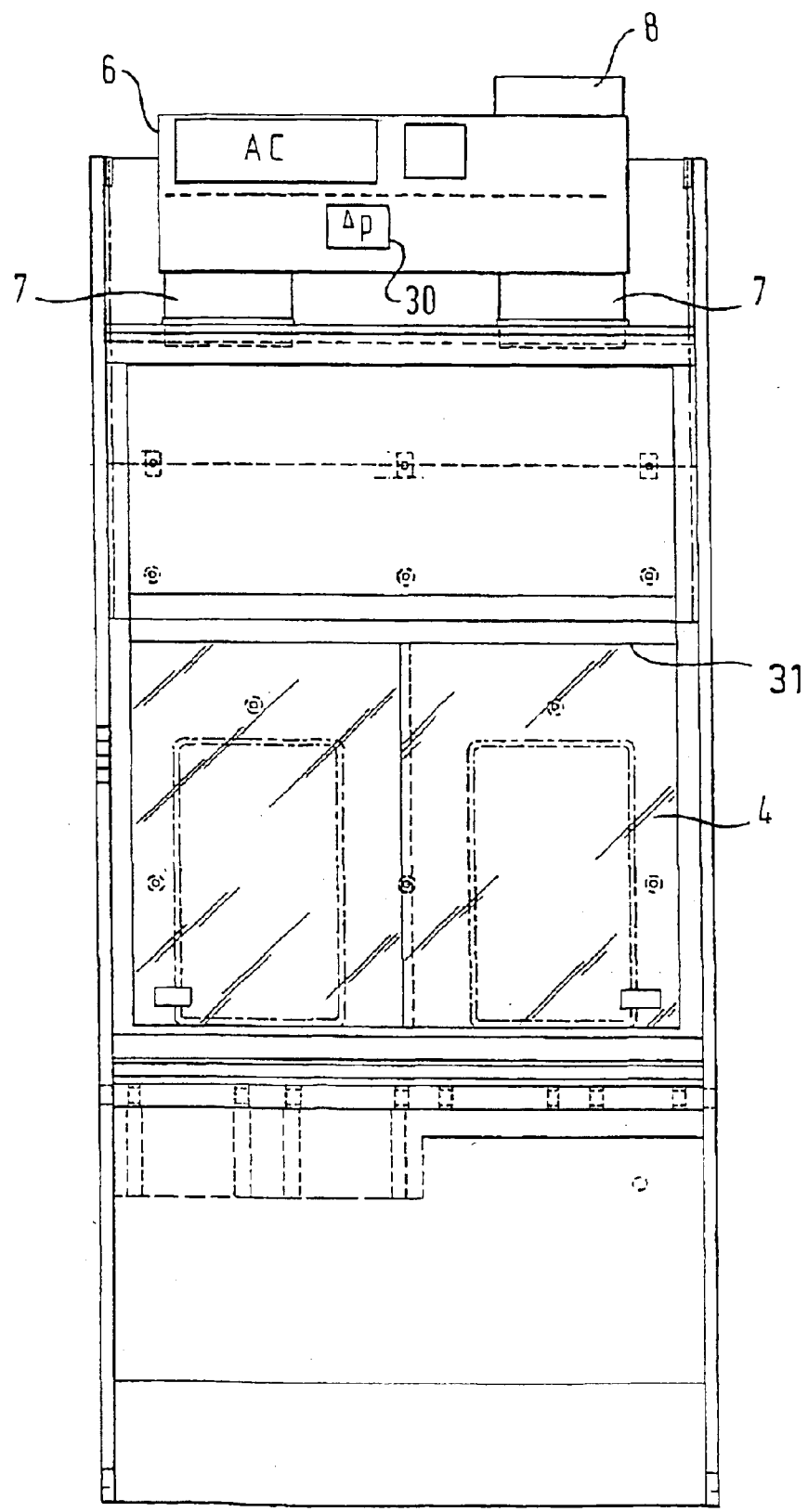
FIG. 1 is a front view of an exhaust with the embodiment of the device according to this invention.
Figure 2:
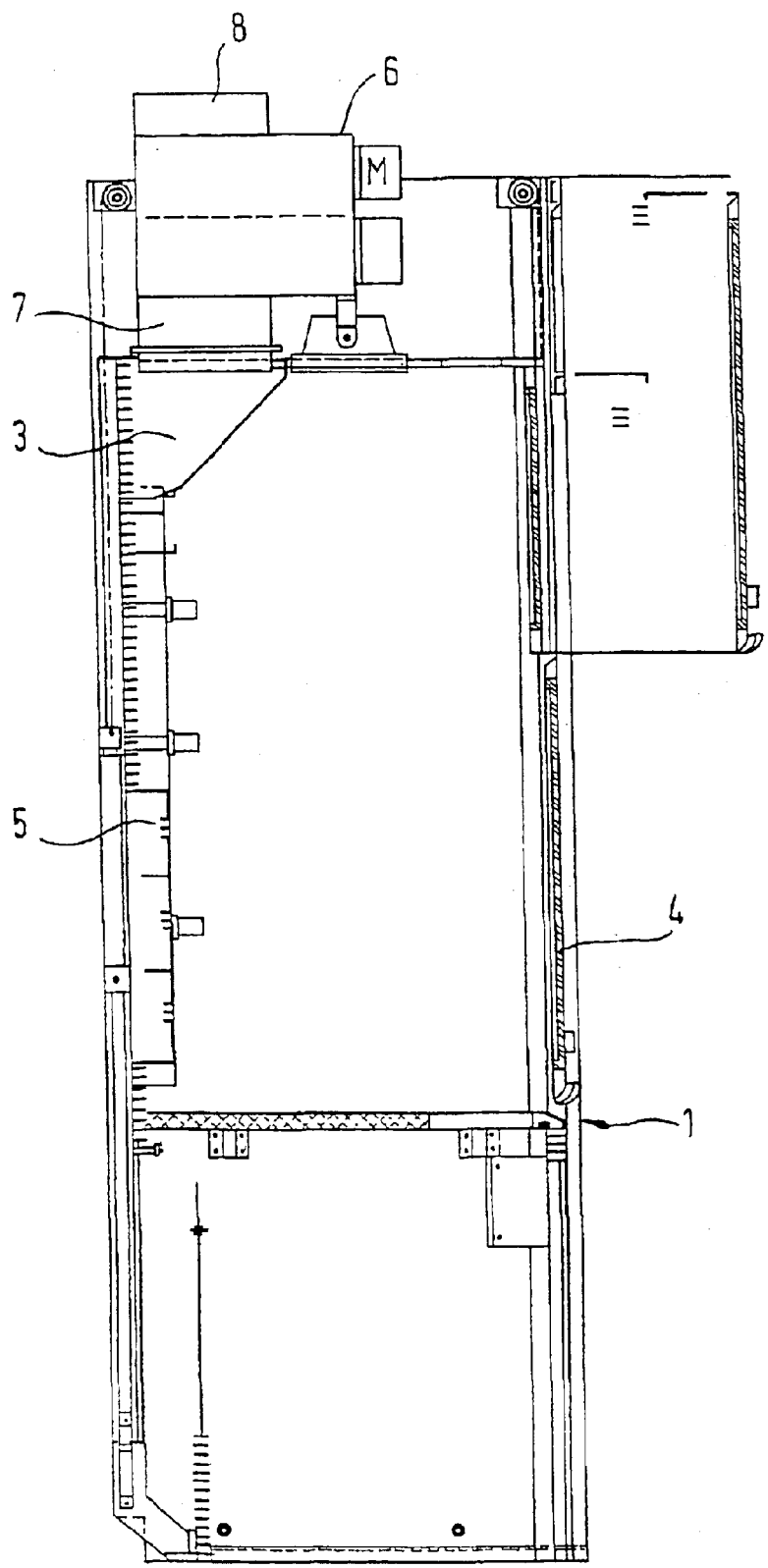
FIG. 2 is a cross-sectional view of the exhaust illustrated in FIG. 1.

As shown in FIGS. 1 and 2, a conventional laboratory exhaust 1 has a sliding window 4 through whose gap air flows into the interior space of the laboratory exhaust 1. This air usually flows through various slots 5 from the working space of the laboratory exhaust 1 into an intermediate collecting space or a reduced pressure chamber 3 in the interior of the laboratory exhaust 1.

A device for regulating the air volume flow which flows through the laboratory exhaust 1 sits on laboratory exhaust 1. This device includes a rectangular box-shaped housing 6, which is connected by one or more connection points 7 to the reduced pressure chamber 3 of the laboratory exhaust 1. Depending on the type of design of the laboratory exhaust 1, the connection points 7 may be one or more pipes or slotted connection channels. The device is also equipped with air deflection devices and an outflow channel 8 through which the air flows out of the device and into an exhaust air system at the installation site and is dissipated.

Figure 5:
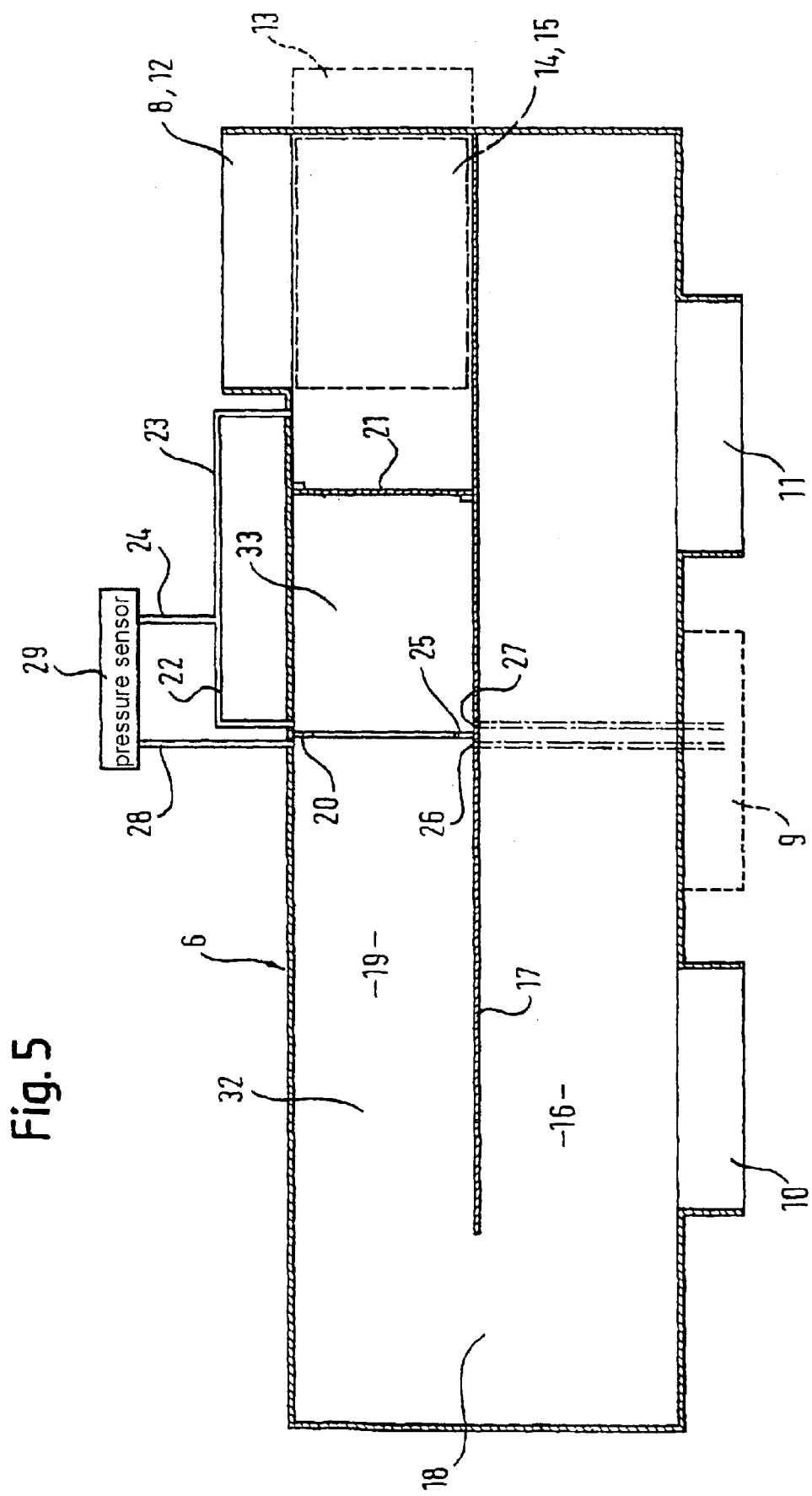
FIG. 5 is a cross-sectional view of the embodiment of the device according to this invention, shown in greater detail.

The inflow devices of housing 6 may have various designs, depending on the design of the laboratory exhaust 1. A laboratory exhaust is often equipped with a round pipe piece 9, as shown in FIG. 5, which may be connected directly to the housing 6. Other laboratory exhausts have two connections 10 and 11, which can be inserted into the housing 6 like pipe piece 9. It is also possible to provide rectangular slots in the housing 6 instead of round openings.

The housing 6 is usually equipped with a round connection piece 8 as the outflow device 8 through which the housing 6 can be ventilated. However, this connection piece may also be rectangular in shape. If necessary, the outflow device may also be installed at another location, i.e., it may lead out of the housing 6 not from above but instead to the right. In this case, a rectangular outgoing connection piece 13 is provided, as shown in FIG. 5. It is also possible to provide an outlet leading out of the housing 6 to the front through a rectangular connection piece 14 or 15 or to the rear. Therefore, the device may be equipped with various inflow devices to adapt it to specific laboratory exhaust systems and so that it can also be ventilated in various ways, namely upward, to the front, to the right or to the rear.

Figure 3:
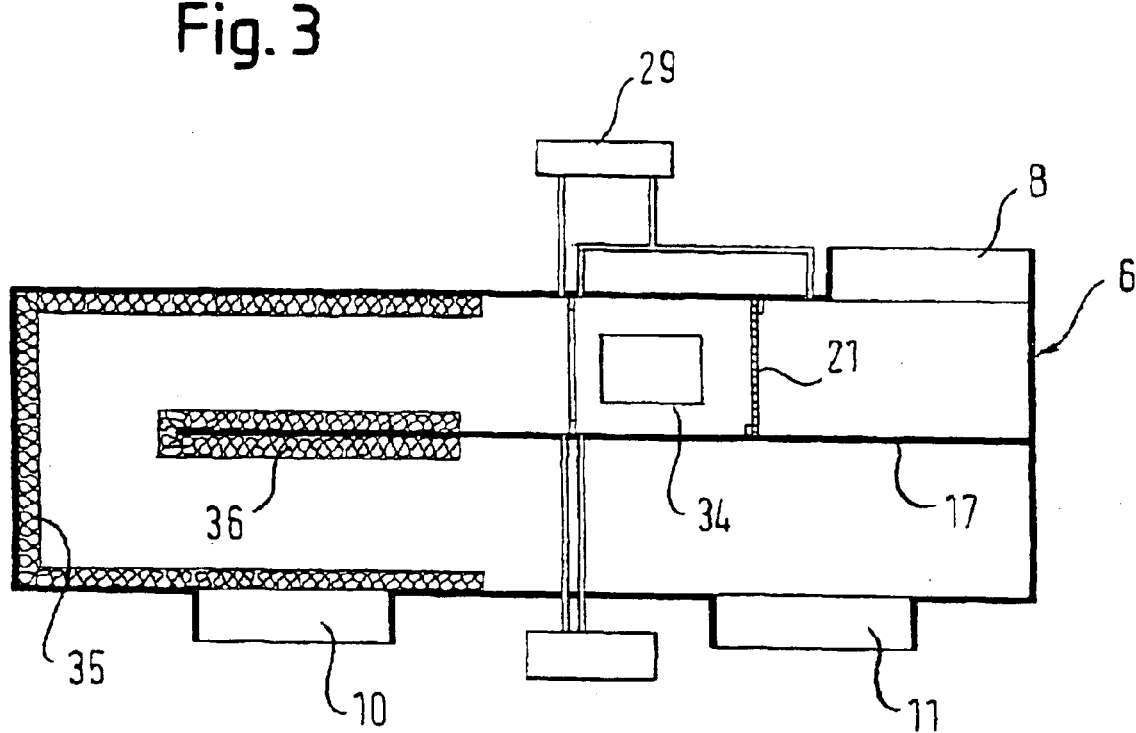
FIG. 3 is a cross-sectional view of the embodiment of the device according to this invention.
Figure 4:
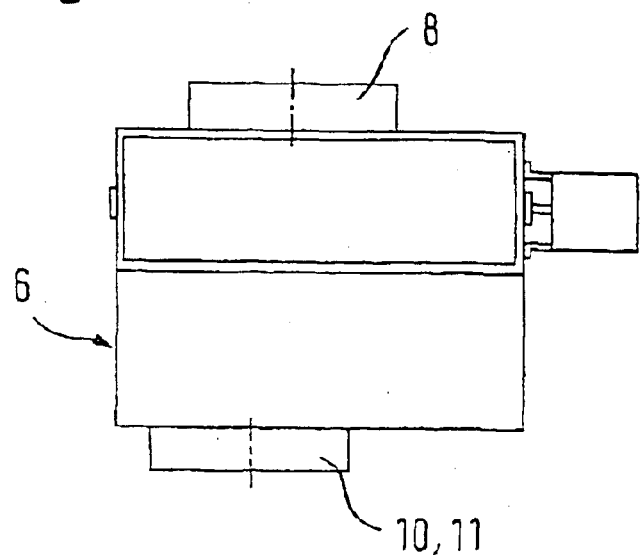
FIG. 4 is a front view of the embodiment shown in FIG. 3.

As shown in FIGS. 3 and 4 and in particular in FIG. 5, the box-shaped housing 6 is divided by a single partition 17 into two parts, namely an intake and calming chamber 16 and an upper chamber 19, these chambers being connected by an air deflection area 18.

A rectangular measurement orifice 20 is provided in the upper chamber 19; it is arranged between the partition 17 and the inside surface of the upper wall of the housing 6 and consists of a rectangular component. The air volume flow is measured at this measurement orifice 20. Downstream from the measurement orifice 20, a rectangular regulating flap 21 for regulating the air volume flow is provided in the upper chamber 19. This rectangular regulating flap is also mounted between the inside surface of the upper wall of the housing 6 and the partition 17. A pressure sensor 29 is situated so that it measures the effective pressure 28 upstream from the measurement orifice 21 and the effective pressure 22 downstream from the measurement orifice 21, forming from this the effective pressure difference across the measurement orifice 20. The air volume flow can be determined accurately from this.

In an especially preferred embodiment which is shown in FIG. 5, the effective pressure downstream from the regulating valve 21, i.e., at a location 23 is also measured. An effective pressure 24 can be formed from the combination of the effective pressures 22, 23. This combined measurement of effective pressure differences at measurement sites situated in succession in the flow channel allows a determination of the air volume flow over a much broader measurement range.

As also shown in FIG. 5, the design may be such that another measurement orifice 25 is provided at the same height in the direction of flow, and a neutral measurement is performed at locations 26 and 27, e.g., with the help of tubing connected there, so that the air volume flow of the exhaust is determined and checked independently of the oncoming and outgoing flow conditions.

An adjusting drive may be provided for actuating the regulating flap 21 on the device.

The regulating device may be connected to sensors (not shown) that are mounted on the sliding windows 31 of the exhaust.

By means of the device described above, it is possible to measure the air volume flow, i.e., the air flow rate, and to regulate it at a constant level or to vary it by way of the sensors on the sliding windows 31 illustrated in FIG. 1 as a function of the position of the sliding windows. The additional measurement site 25 is used for monitoring the regulating process. This can be checked by known methods according to German Patent Application 19600299 A1; however, the functioning of the device can be checked at any time through the measurement at the additional measurement point 25.

The device is designed so that it takes up most of the width of the exhaust. Therefore, it can be placed directly on the laboratory exhaust 1 without requiring any additional air collecting channels. The required air collecting channels are integrated into the device.

With such a width of the device, the path 32 between the deflecting edge on the partition 17 and the measurement orifice 20 is so long that an adequate oncoming flow at the measurement orifice 20 and/or measurement orifices 20, 25 can be achieved. If the path between the measurement orifice 20 and the regulating flap 21 is long enough, this results in excellent oncoming flow distances, and measured values with a high accuracy can be obtained. An inspection port through which the measurement sites of the pressure sensors and the regulating valve can be monitored at any time is provided in the front area 34 of the device.

This device does not have any direct sound emission into the interior of the laboratory exhaust, because the air is deflected. Therefore, the device also functions as insertion damping with a sound attenuating effect.

However, if the sound level is to be further reduced, it is also possible to line the inside walls of the housing 6 with sound absorbing mats 35, 36, shown in FIG. 3.

What is claimed is:

1. A device for regulating the air volume flow for a laboratory exhaust, comprising:

a rectangular housing equipped with inflow devices that are connectable to the interior of the laboratory exhaust and with outflow devices that are connectable to an exhaust air system, the interior of said housing being divided by a partition into a calming part on an exhaust side and a measurement and regulating part on an outflow side, said calming part and said measuring and regulating part being connected by an air deflection area; and at least one rectangular measurement orifice having a plurality of pressure measurement devices and a rectangular regulating flap consecutively arranged with a distance between said at least one rectangular measurement orifice and said regulating flap in a direction of flow between a housing wall and said partition in the measurement and regulating part.

2. The device according to claim 1, further comprising two measurement orifices, said measurement orifices being arranged at the same level in the measurement and regulating part in the direction of flow.

3. The device according to claim 2, wherein the plurality of pressure measurement devices are designed to detect an effective pressure in front of the at least one measurement orifice downstream from the at least one measurement orifice and downstream from the regulating flap, and to form the effective pressure difference across the regulating flap.

4. The device according to claim 3, wherein the plurality of pressure measurement devices are adapted to detect the effective pressure in front of the at least one measurement orifice downstream from the at least one measurement orifice and downstream from the regulating flap and to form the effective pressure difference across the regulating flap.

5. The device according to claim 4, wherein said housing contains a sound-absorbent lining.

6. The device as recited in claim 5, wherein the at least one measurement orifice and a regulating flap are arranged to form calming zones between the deflecting area and the at least one measurement orifice and between the at least one measurement orifice and the regulating flap.

7. The device according to claim 6, further comprising a maintenance port in a front side of the housing.

8. The device according to claim 7, wherein said housing has a depth that is greater than the height of said housing.

9. The device according to claim 8, wherein the plurality of pressure measurement devices are adapted to detect the effective pressure in front of the at least one measurement orifice downstream from the at least one measurement orifice and downstream from the regulating flap, and to form the effective pressure differences across the regulating flap.

10. The device according to claim 1, wherein the plurality of pressure measurement devices are adapted to detect the effective pressure in front of the at least one measurement orifice, downstream from the at least one measurement orifice and downstream from the regulating flap, and to form the effective pressure differences across the regulating flap.

11. The device according to claim 1, wherein said housing contains a sound-absorbent lining.

12. The device as recited in claim 1, wherein the at least one measurement orifice and a regulating flap are arranged to form calming zones between the deflecting area and the at least one measurement orifice and between the at least one measurement orifice and the regulating flap.

13. The device according to claim 1, further comprising a maintenance port in a front side of the housing.

14. The device according to claim 1, wherein said housing has a depth that is greater than the height of said housing.

* * * * *